Jan. 7, 1947.  G. F. JEROME  2,413,711
POULTRY PICKING MACHINE
Filed Jan. 13, 1941  2 Sheets-Sheet 1
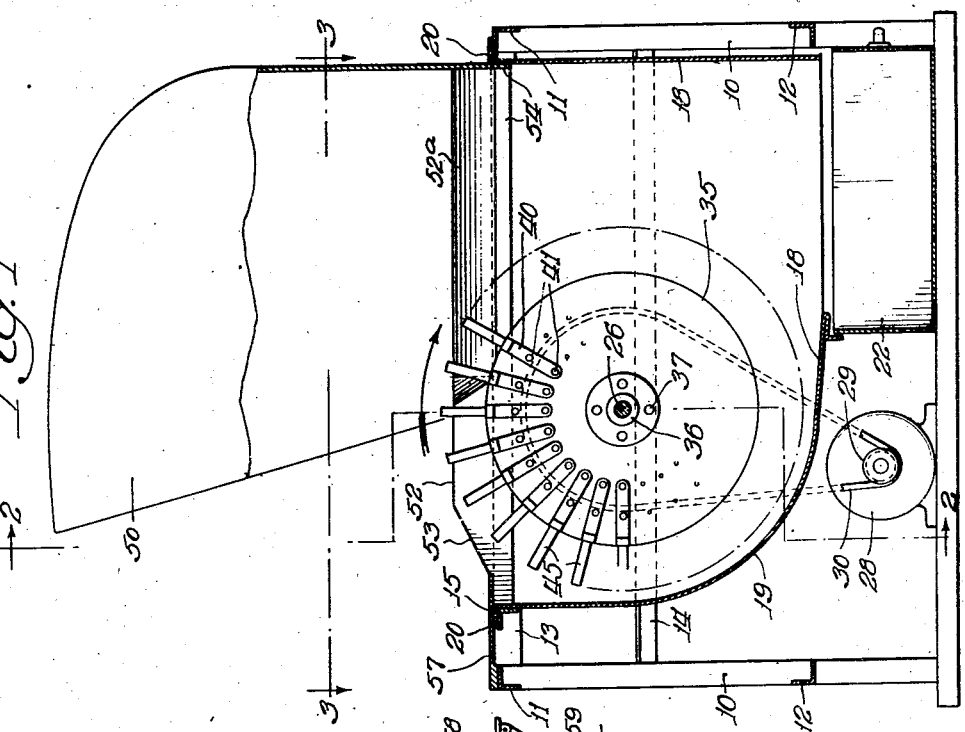
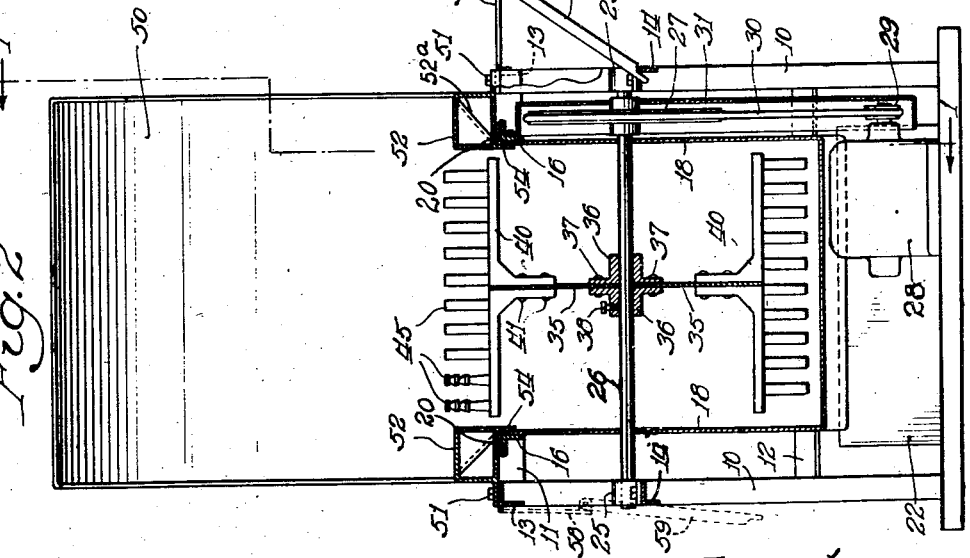
Inventor:
George F. Jerome Jan. 7, 1947.     G. F. JEROME     2,413,711
POULTRY PICKING MACHINE
Filed Jan. 13, 1941     2 Sheets-Sheet 2
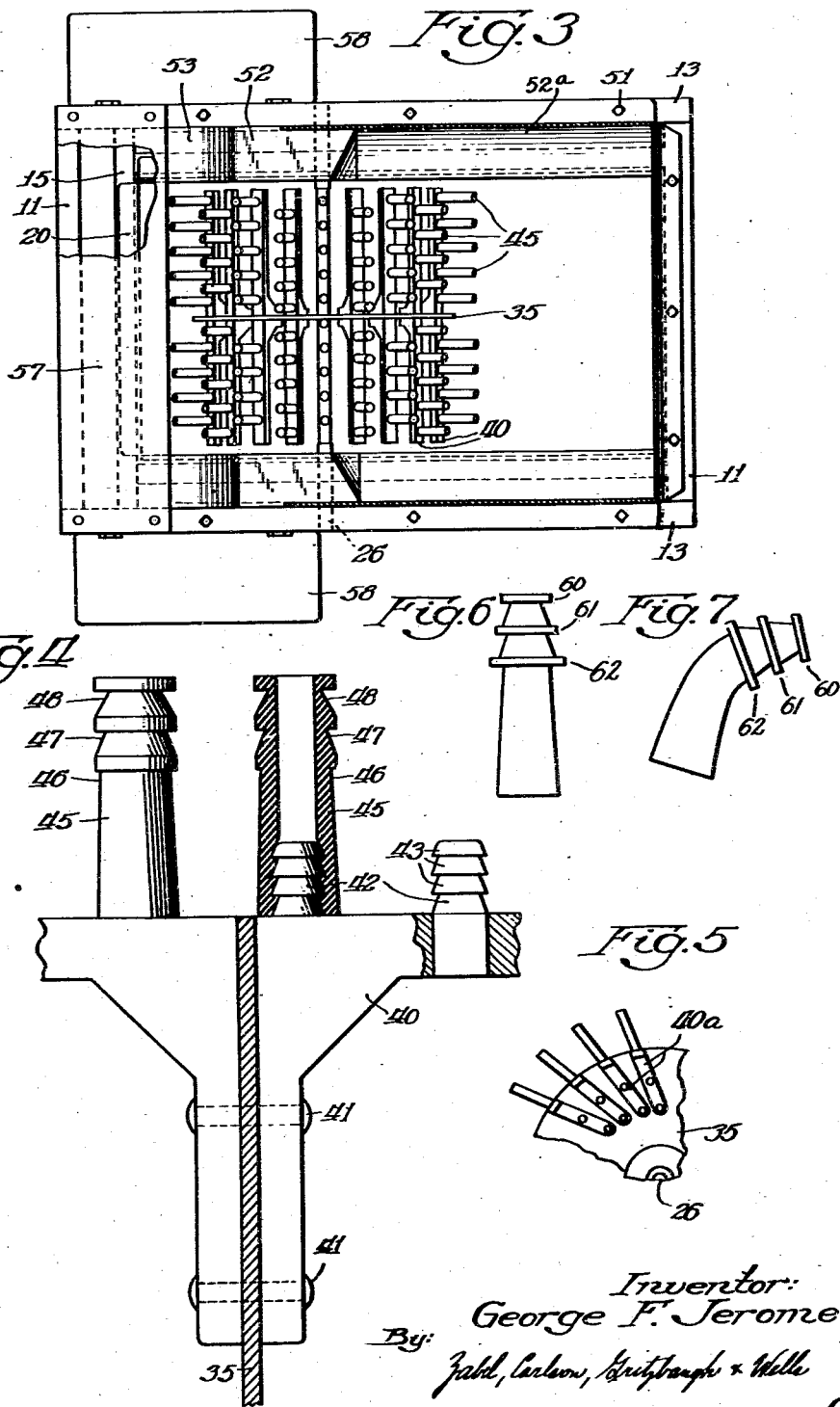
Inventor:
George F. Jerome Patented Jan. 7, 1947

2,413,711

UNITED STATES PATENT OFFICE 2,413,711

POULTRY PICKING MACHINE

George F. Jerome, Fort Wayne, Ind.

Application January 13, 1941, Serial No. 374,271

11 Claims. (Cl. 17—11.1)

The present invention relates to poultry picking machines and particularly is directed toward a machine of this character wherein a plurality of resilient picking fingers is directed through the feathers of poultry, such as chickens or the like, to remove said feathers by means of friction between the feathers and the resilient fingers. A particular object of the present invention is to provide a machine which easily may be disassembled in order to permit thorough cleaning of the machine.

A chief objection to prior devices of this character resides in the inability to disassemble the various parts for purposes of cleaning. As will be understood, the work performed by machines of this character results in the creation of a great deal of muss and filth which periodically must be removed from the machine in order to maintain a necessary standard of sanitation. The present invention contemplates a device having its structural framework disposed externally of the tank or hopper in which the picking process is carried out. The tank or hopper readily may be removed from the structural framework for purposes of cleaning or disinfecting. A removable hood also is provided to confine the by-products of the process as well as to provide for easy cleaning.

Another object of the present invention is to provide an improved means for mounting the resilient picking fingers. In carrying out this object, I provide a rotatable disk which carries a series of spaced peripheral brackets. Each bracket has spaced projecting pegs which detachably receive the resilient picking fingers. This open construction of the picking finger unit permits facility of cleaning. With the general structure as outlined above, it is a simple matter to direct a stream of water into the interior of the machine and with the help of a brush to effectively wash the machine free of feathers and other by-products.

A further object of the present invention contemplates an improvement in the contour and cross-section of the resilient picking fingers whereby the effective life of the fingers is materially increased.

Other features and advantages of the present invention will appear more fully as the description proceeds, reference being had to the accompanying drawings wherein a preferred form of the invention is shown. It is to be understood that the drawings and description are illustrative only and are not to be taken as limiting the invention except in so far as it is limited by the claims.

In the drawings,

Fig. 1 is a side sectional view of a poultry picking machine embodying the present invention taken on the line 1—1 of Fig. 2;

Fig. 2 is a sectional view on the line 2—2 of Fig. 1;

Fig. 3 is a sectional view on the line 3—3 of Fig. 1;

Fig. 4 is an enlarged view, partly in section, of the brackets and resilient picking fingers mounted thereon;

Fig. 5 is a fragmentary view of the disk showing a modified manner of mounting the brackets; and Figs. 6 and 7 are views of a modified picking finger.

Referring now to the drawings, and particularly to Figs. 1 and 2 thereof, the present invention contemplates a poultry picking machine comprising an exterior structural framework, a tank or hopper disposed within the structural framework and a removable hood 50 covering a portion of the open top of the tank or hopper. The structural framework is rectangular in shape and includes corner uprights 10, which may be ordinary angle irons. End cross-bars 11 and 12, and side cross-bars 13 and 14 extend between the corner uprights 10 and together constitute part of the supporting framework. A cross-member 15 connects the side members 13 at a spaced distance from the front end of the framework. Longitudinal cross-members 16, each spaced inwardly from a member 13, connect the member 15 and the rear cross-member 11. Members 11, 15 and the two members 16 define a rectangular opening in the top of the structural framework.

All members of the above described structural framework are shown as angle irons, although members of any other equivalent cross-section may be used if desired.

The main tank or hopper 18 is substantially a rectangular box open on the top and on a portion of the bottom, the rear portion. The front portion of the bottom of the hopper 18 is curved upwardly as shown at 19 to cooperate with the arc described by the picking fingers, as hereinafter described. The sides and ends of the tank or hopper 18 have their upper portions bent outwardly to form flanges 20. The tank or hopper 18 is of such a size that it may be inserted within the rectangular opening defined by member 15, the rear member 11 and the members 16. The outwardly bent flanges 20 are received on the said members and support the tank or hopper in position in the framework.

A removable box 22 is disposed immediately below the bottom opening in the tank or hopper 18. The great bulk of the feathers removed from the poultry accumulate in the box 22 and may be disposed of easily from time to time as necessary.

Bearing members 25 are oppositely secured to the cross-members 14 just forward of the midpoints of the said members. A rotatable shaft 26 is journalled in the bearings 25 and extends through the interior of the hopper 18. Suitable holes are provided in the sides of the hopper to receive the shaft. A pulley 27 is secured to the shaft 26 between one of the bearings 25 and the adjacent side of the hopper 18. The pulley is shown on the right-hand end of the shaft in Fig. 2. A suitable prime mover, such as an electric motor 28, has its driving pulley 29 disposed directly below the pulley 27. An ordinary endless belt 30 connects the two pulleys 27 and 29. As a safety measure, a guard 31 encloses the pulleys and the belt.

At the midpoint of the shaft 26 within the hopper 18 is located a disk 35 adapted to rotate with the shaft 26. Sleeve members 36 on the shaft 26 are connected with rivets 37 which extend through suitable holes in the disk 35. The sleeve members are secured to the shaft 26 by means of set screws 38.

Oppositely disposed brackets 40 are secured to the disk at spaced points on its periphery. As best shown in Fig. 4, the brackets 40 may be secured to the disk by means of bolts or rivets 41. At spaced intervals along the horizontal arm of the bracket 40 are finger receiving pegs 42. The pegs 42 are round in cross-section and are divided into segments having sloping sides as shown at 43. As best shown in Fig. 3, the pegs 42 on one set of brackets are staggered with respect to the pegs on adjacent brackets. Therefore, as the disk and attached brackets are rotated, the fingers extending from the pegs 42 will successively contact all portions of the fowl being processed.

Resilient picking fingers 45 comprising cylindrical pieces of rubber or the like are adapted to be received on the pegs 42. The interior of the finger at one end is divided into sloping sided segments for cooperation with the sloping sided segments 43 on the pegs. These cooperating corrugations securely retain the fingers in position regardless of the stresses set up in the fingers by operation of the machine.

The cross-section and contour of the picking end of the finger are features of great importance in the present invention. This end of the finger is provided with a series of spaced circumferential notches as shown at 46, 47, and 48 which provide in effect a plurality of substantially truncated cone-like portions shown in Fig. 4. The notch at 46 is of relatively short depth, the notch at 47 is of relatively greater depth, while the notch at 48 is of still greater depth. Therefore, the critical cross-section of the finger increases away from the end. This construction prevents buckling or collapsing of the resilient finger when the end thereof is brought in contact with the resistance afforded by the feathers. Notches of the depth shown at 48 are necessary in order to most effectively pluck the feathers from the poultry. However, if all the notches were made of that depth the fingers would bend as they came in contact with the feathers and after repeated bending and recovery would soon structurally fail. To avoid this difficulty I have successively increased the cross-section of the finger at the notches, which cross-sections substantially increase as the increase of bending moment set up in the finger. This feature results in a greatly increased life of the resilient picking fingers.

A removable hood 50 is disposed over the tank 18 throughout a portion of its length. The hood 50 is somewhat wider than the said tank and is adapted to be supported by the cross-members 13 to which it is removably secured by bolts 51. The space between the sides of the tank 18 and the sides of the hood 50 is bridged by shelf portions 52 which are integral with the hood. These shelf portions 52 comprise box-like structures which extend forwardly from the front end of the hood for a portion of the distance to the front end of the tank. From this point to the front end of the tank, the shelf structures incline forwardly as shown at 53 and meet the cross-members 13. Within the hood, the shelf members 52 merge into inclined side portions 52a which extend to the rear end of the hood. The rear end and the side portions 52a of the hood have downward extensions 54 which are received within the upper edges of the tank 18. This overlapping feature permits proper drainage of water from the hood into the tank, as is necessary for purposes of effective cleaning.

A work-shelf 57 extends across the frame-work on the cross-members 11 and 15. The poultry to be plucked are placed on this table and from there moved into the path of the revolving picking fingers. Side tables 58 may be hinged to the cross-members 13 and supported in operative position by means of braces 59 which engage the lower cross-members 14.

In operation, the disk rotates in the direction indicated by the arrow in Fig. 1. The operator slides a fowl from the work-table 57 into the zone of the rotating picking fingers. Sufficient friction is developed between the picking fingers and the feathers to effectively remove the feathers from the fowl. The feathers as well as any blood or other waste are carried by the rotating fingers into the tank where most of such material is thrown off into the opening to the removable box 22. The box, of course, may be emptied from time to time as necessary with very little delay in the job. At the end of a job the machine readily may be cleaned by directing a stream of water into the hood, tank and through the picking finger assembly. In view of the fact that there is no structure or other obstructions within the hood or tank, a thorough job of cleaning may be effected in this manner. Periodically it may be desirable to disassemble the various parts of the machine and thoroughly sterilize them. Due to the simple construction set forth herein, it is a simple matter to carry out such a step.

In the modification shown in Fig. 5, the finger mounting brackets 40a are inclined at an angle with the radii of the rotatable disk 35. The finger mounting pegs carried by the brackets 40a are thus inclined with respect to the radii of the arc of rotation of said brackets in a direction rearwardly to the direction of rotation of said brackets. I have found that an angle of 30°–45° gives the best results. This construction, with the corresponding inclination of the picking fingers, results in more effective operation of the picking fingers, particularly in the case of a fowl being picked for cold storage purposes. As is well known in the art, fowl are subjected to a hot water treatment before they are picked. The higher the temperature used, the softer the skin becomes and the easier the feathers may be removed. Too much softening of the skin, however, results in skin bruises during the picking process, which bruises spoil the fowl for cold storage purposes. Such bruises generally are not objectionable as far as immediate sale of the fowl is concerned. Temperatures of 140°–145° often are used for commercial poultry (non-cold storage), while temperatures not in excess of 130° generally are used in case of poultry picked for cold storage purposes.

In cases where the lower temperatures are used, more "pull" must be exerted on the feathers than in cases where the skin is made softer. By inclining the picking fingers in accordance with this modification, each of the gripping flanges on a finger contacts the feathers with substantially equal frictional engagement, thereby effecting increased "pull" with a minimum impact.

A modified form of picking finger is shown in Figs. 6 and 7. In this case the gripping flanges increase in diameter away from the end of the finger. That is, flange 60 is of least diameter, flange 61 is of somewhat greater diameter and flange 62 is larger than flange 61. This construction is advantageous in that less pressure on the picking finger is required to bend the finger into an operating position whereby all the flanges engage the feather. This finger advantageously may be used with the inclined brackets shown in Fig. 5 in the case low temperature is used to condition the fowl for picking. In this way, contact harshness between the finger and the feathers is minimized with the result that the skin of the fowl suffers little or no injury.

Particular attention is directed to my disk, bracket and picking finger assembly. From the standpoint of sanitation, this assembly readily may be cleaned or sterilized. Secondly, the picking fingers may be readily removed and replaced on the brackets. This is important because certain replacements will become necessary regardless of the effort I have made to produce long wearing fingers. Thirdly, the progressive cross-sections I have provided in the fingers effectively eliminate all collapsing of the fingers due to friction set up during the picking process.

From the above description, the advantages and operation of my improved poultry picking machine will be readily apparent to those skilled in this art.

Having thus described my invention, what I claim as new and desire to secure by Letters Patent is:

1. A poultry picking machine comprising a rotatable disk, a plurality of oppositely disposed peripherally spaced arms on said disk and extending substantially at right angles to the plane thereof and spaced resilient picking fingers projecting from said arms.

2. A poultry picking machine comprising a rotatable disk, a plurality of peripherally spaced arms on said disk and spaced resilient picking fingers projecting from said arms, said fingers on one arm being staggered with respect to the fingers on an adjacent arm.

3. In a poultry picking machine, a rotatable disk, peripherally spaced arms oppositely extending from said disk substantially at right angles to the plane thereof, spaced finger holding means on said arms and resilient picking fingers removably attached to said means.

4. In a poultry picking machine, a rotatable disk, peripherally spaced arms oppositely extending from said disk substantially at right angles to the plane thereof, spaced pegs on said arms, said pegs on one arm being staggered with respect to the pegs on an adjacent arm, and resilient picking fingers removably attached to said pegs.

5. In a poultry picking machine, a rotatable disk, peripherally spaced arms oppositely extending from said disk, spaced pegs on said arms, said pegs having corrugated surfaces, and resilient picking fingers removably attached to said pegs, said picking fingers having interior corrugations for cooperation with the corrugated surfaces of said pegs.

6. In a poultry picking machine, a rotatable member to which is attached a plurality of resilient picking fingers, said fingers each comprising a cylinder of resilient material having spaced circumferential notches at the portion thereof remote from said member, the depth of the most remote notch being the greatest and the depth of the other notches decreasing as their distance from the free end of the cylinder increases.

7. In a poultry picking machine, a rotatable member to which is attached a plurality of resilient picking fingers, said fingers each comprising a cylinder of resilient material having a portion including a plurality of spaced circumferential flanges connected by inclined surfaces, said surfaces being inclined in a greater degree as the distance from the end of the cylinder decreases, whereby the critical cross-section of the resilient material decreases toward the free end of the cylinder.

8. In a poultry picking machine of the character described, a means for mounting peripherally spaced rows of spaced fingers, said means including a rotatable disk having oppositely disposed peripherally spaced arms thereon extending substantially at right angles to the plane of said disk, spaced pegs on said arms, said pegs being inclined with respect to the radius of the arc of rotation of said arms in a direction rearwardly to the direction of rotation of said arms, and resilient picking fingers mounted on said pegs.

9. A resilient picking finger for a poultry picking machine comprising a substantially cylindrical body portion having at one end thereof a picking portion and at the other end thereof a base portion, the picking portion comprising a plurality of superimposed, substantially truncated cone-like portions mounted on the base portion, means adjacent to the base of each truncated cone-like portion serving as a feather engaging portion, and the side walls of each cone-like portion being disposed between adjacent feather engaging portions.

10. A resilient picking finger for a poultry picking machine comprising a cylindrical body portion having at one end thereof a picking portion and at the other end thereof a base portion, the picking portion comprising a plurality of superimposed, substantially truncated cone-like portions mounted on the base portion, the base of each truncated cone-like portion projecting beyond the walls of that part of the base portion that is adjacent to the picking portion and serving as a feather engaging portion, and the side walls of the cone-like portion being disposed between adjacent feather engaging portions.

11. A resilient picking finger for a poultry picking machine comprising a cylindrical body portion having at one end thereof a picking portion and at the other end thereof a base portion, the picking finger comprising a plurality of superimposed, substantially truncated cone-like portions mounted on the base portion, means adjacent to the base of each truncated cone-like portion serving as a feather engaging portion and the side walls of the cone-like portion being disposed between adjacent feather engaging portions, each of said bases projecting beyond the walls of the cone-like portion and beyond the walls of that part of the base portion that is adjacent to the picking portion.

GEORGE F. JEROME.